(12) United States Patent
Puranik et al.

(10) Patent No.: US 9,324,046 B2
(45) Date of Patent: Apr. 26, 2016

(54) ENTERPRISE ECOSYSTEM

(71) Applicant: Cellco Partnership, Basking Ridge, NJ (US)

(72) Inventors: Gagan Puranik, Northborough, MA (US); Michael R. Flynn, Norwood, MA (US)

(73) Assignee: Cellco Partnership, Basking Ridge, NJ (US)

( * ) Notice: Subject to any disclaimer, the term of this patent is extended or adjusted under 35 U.S.C. 154(b) by 332 days.

(21) Appl. No.: 13/681,498

(22) Filed: Nov. 20, 2012

(65) Prior Publication Data

US 2014/0143709 A1    May 22, 2014

(51) Int. Cl.
*G06F 3/0482* (2013.01)
*G06F 3/0481* (2013.01)
*G06Q 10/06* (2012.01)

(52) U.S. Cl.
CPC ..................................... *G06Q 10/06* (2013.01)

(58) Field of Classification Search
None
See application file for complete search history.

(56) References Cited

U.S. PATENT DOCUMENTS

| | | | | |
|---|---|---|---|---|
| 5,295,243 | A * | 3/1994 | Robertson et al. | 715/848 |
| 5,917,492 | A * | 6/1999 | Bereiter et al. | 715/854 |
| 7,853,881 | B1 * | 12/2010 | Aly Assal et al. | 715/734 |
| 8,326,823 | B2 * | 12/2012 | Grandhi et al. | 707/717 |
| 2005/0160158 | A1 * | 7/2005 | Firebaugh et al. | 709/223 |
| 2005/0273730 | A1 * | 12/2005 | Card et al. | 715/853 |
| 2008/0263022 | A1 * | 10/2008 | Kostorizos et al. | 707/5 |
| 2008/0295037 | A1 * | 11/2008 | Cao et al. | 715/852 |
| 2011/0105192 | A1 * | 5/2011 | Jung et al. | 455/566 |
| 2011/0138340 | A1 * | 6/2011 | Holm-Petersen et al. | 715/854 |
| 2011/0153666 | A1 * | 6/2011 | Flynn et al. | 707/779 |
| 2013/0144948 | A1 * | 6/2013 | Carriero et al. | 709/204 |
| 2013/0159896 | A1 * | 6/2013 | Mayerle | G06Q 10/06375 715/765 |
| 2014/0074526 | A1 * | 3/2014 | Caudron | G06Q 10/0633 705/7.13 |

* cited by examiner

*Primary Examiner* — Mahelet Shiberou

(57) ABSTRACT

A method includes identifying a plurality of content hubs associated with an enterprise. Each content hub represents a type of content associated with an enterprise. The method also includes identifying primary nodes dependent on each content hub. The primary nodes represent subgroups of the content associated with the content hub. The method includes identifying secondary nodes associated with each primary node. The secondary nodes represent content items from the subgroups of content associated with the primary nodes. The method further includes arranging the content hubs in a visual representation of an enterprise ecosystem. The enterprise ecosystem displays a relationship between the content hubs. The method also includes displaying dependent nodes within a relationship context of the enterprise ecosystem based on user selection.

20 Claims, 14 Drawing Sheets

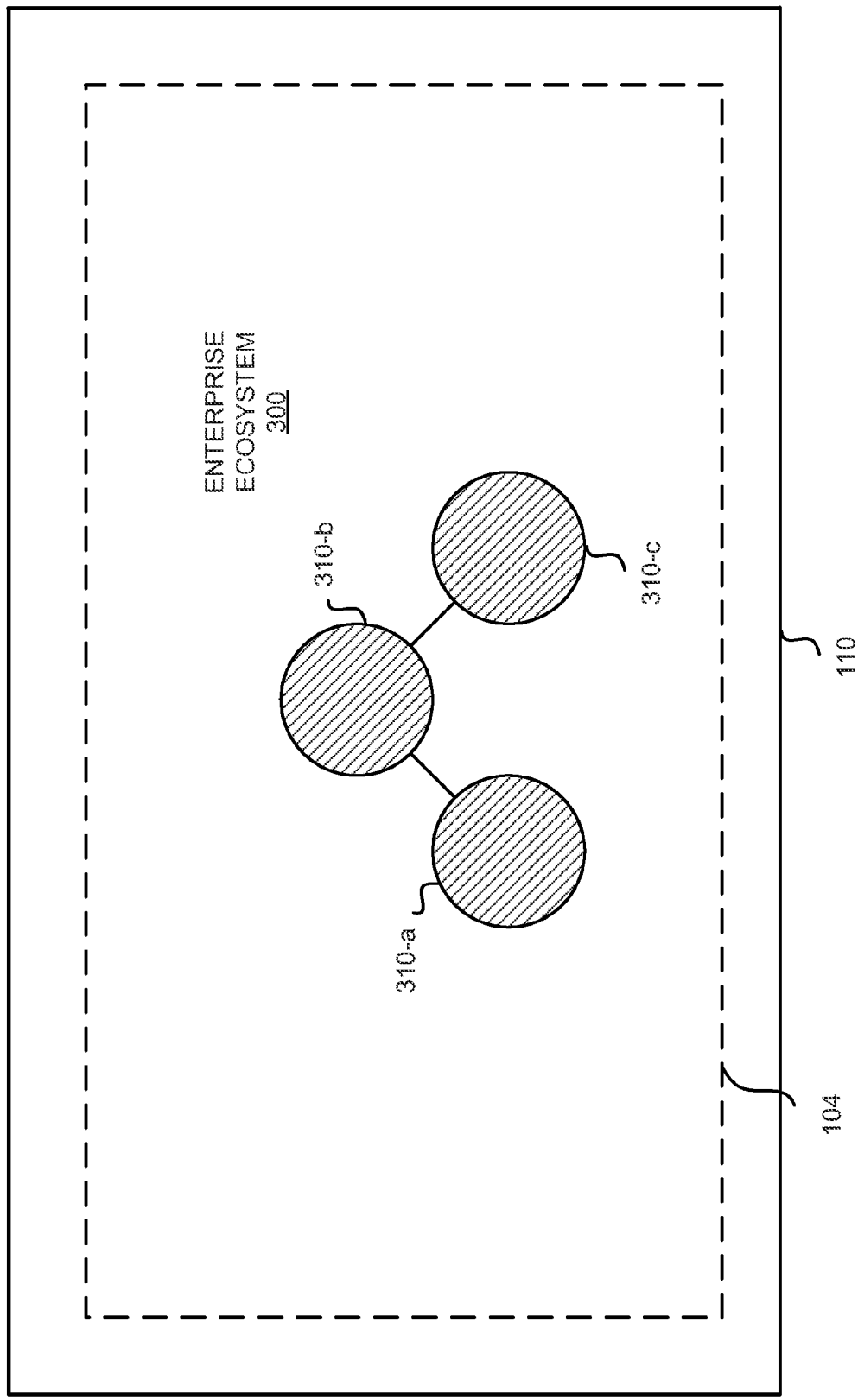

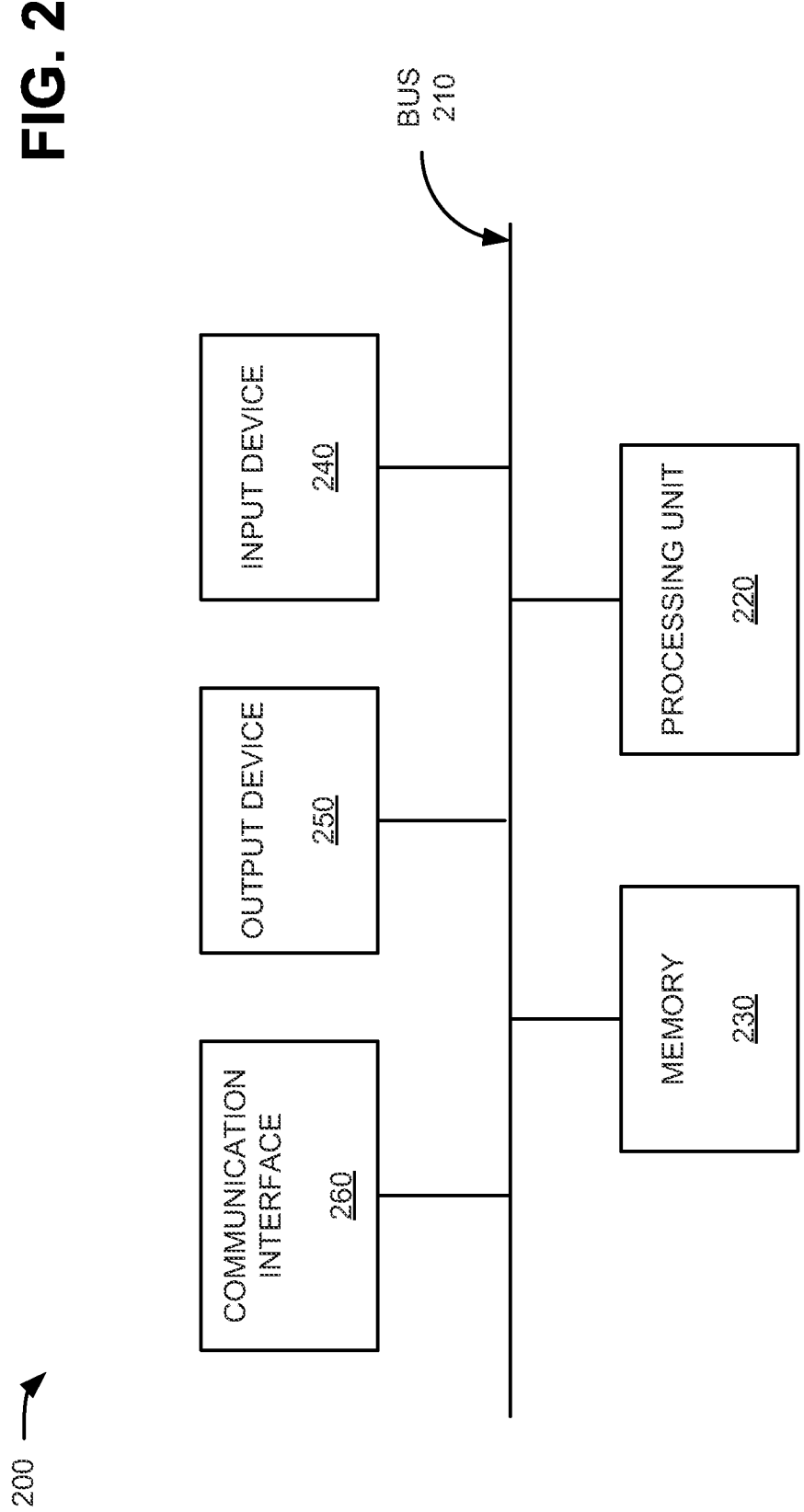

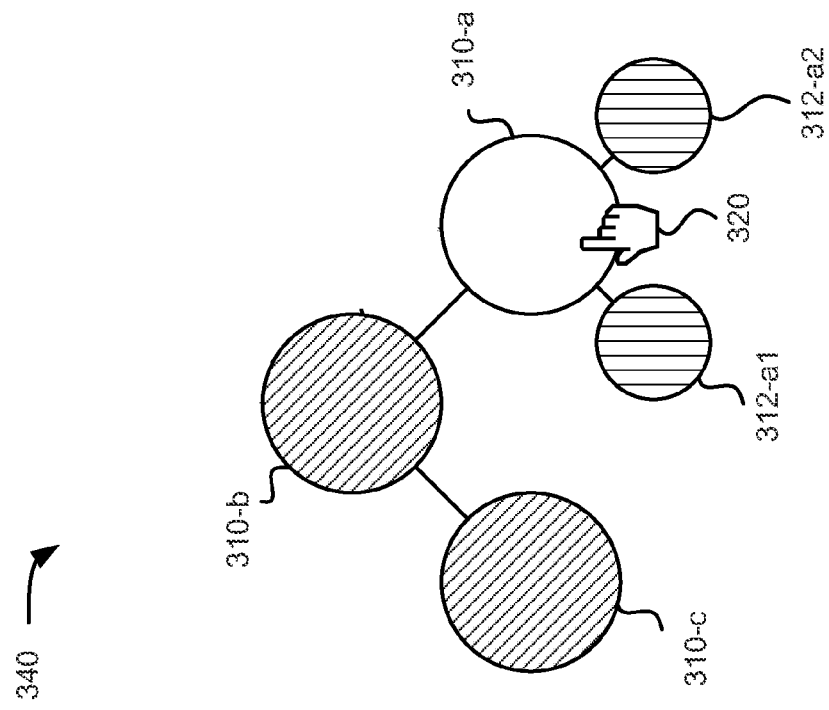
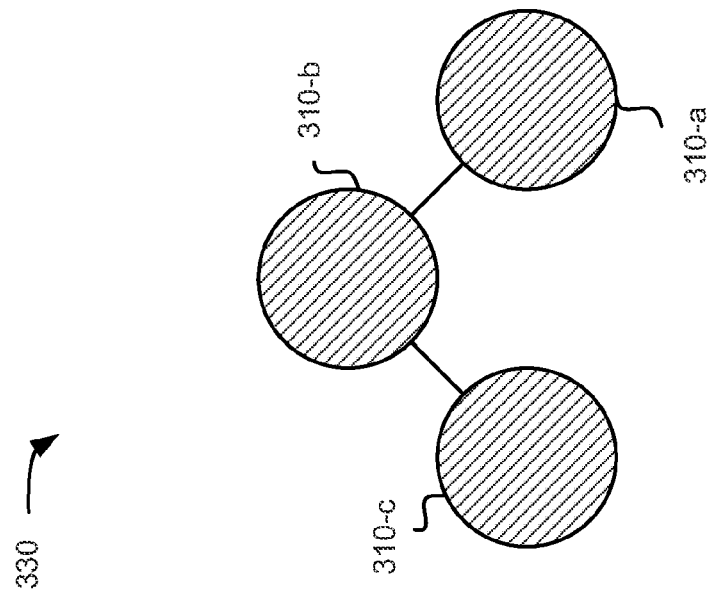
FIG. 3B
FIG. 3A

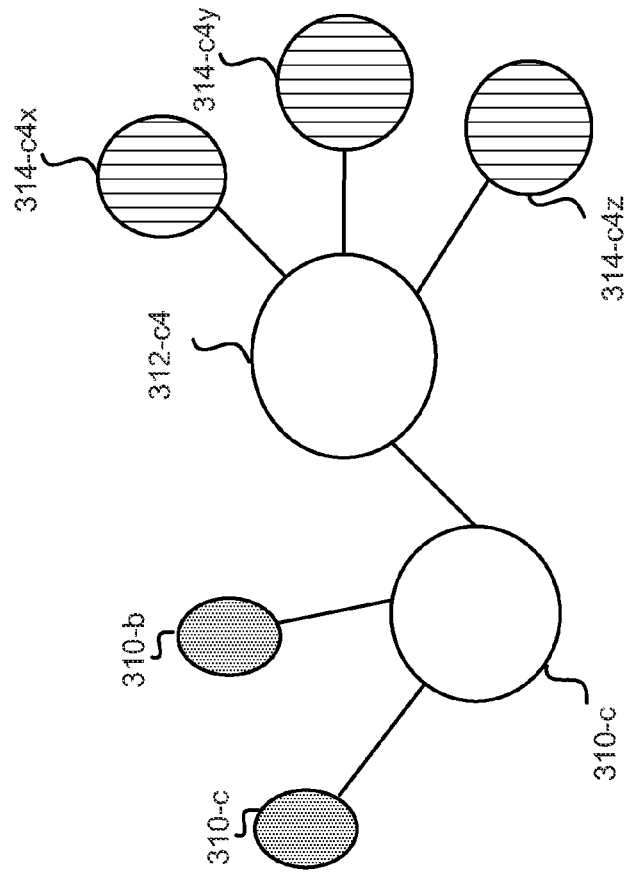
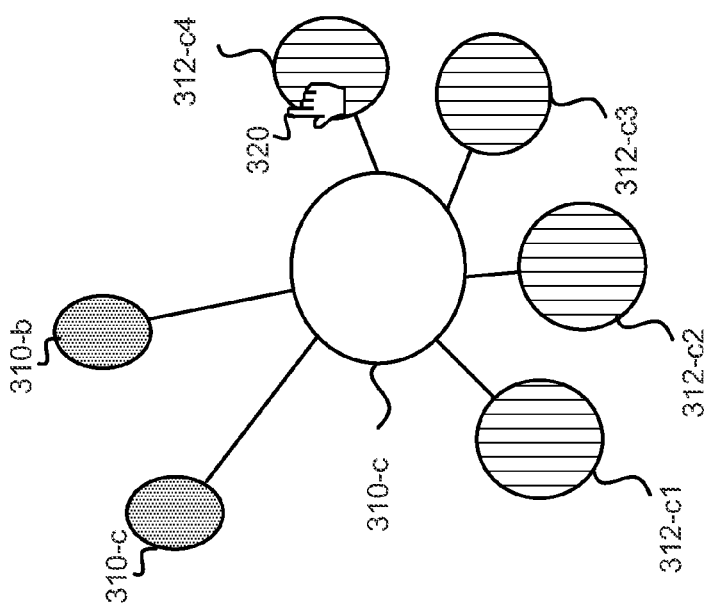
FIG. 4D
FIG. 4C

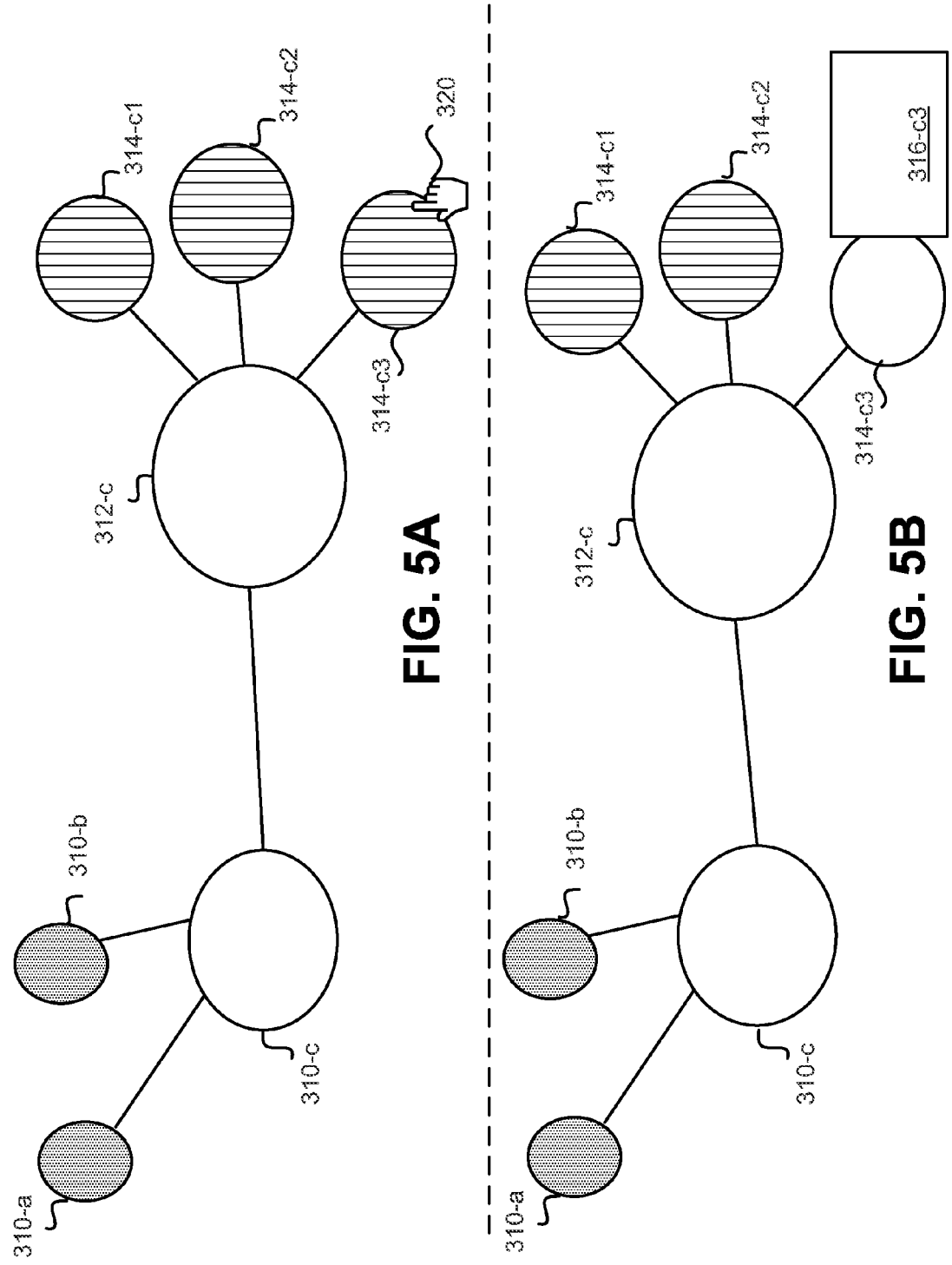

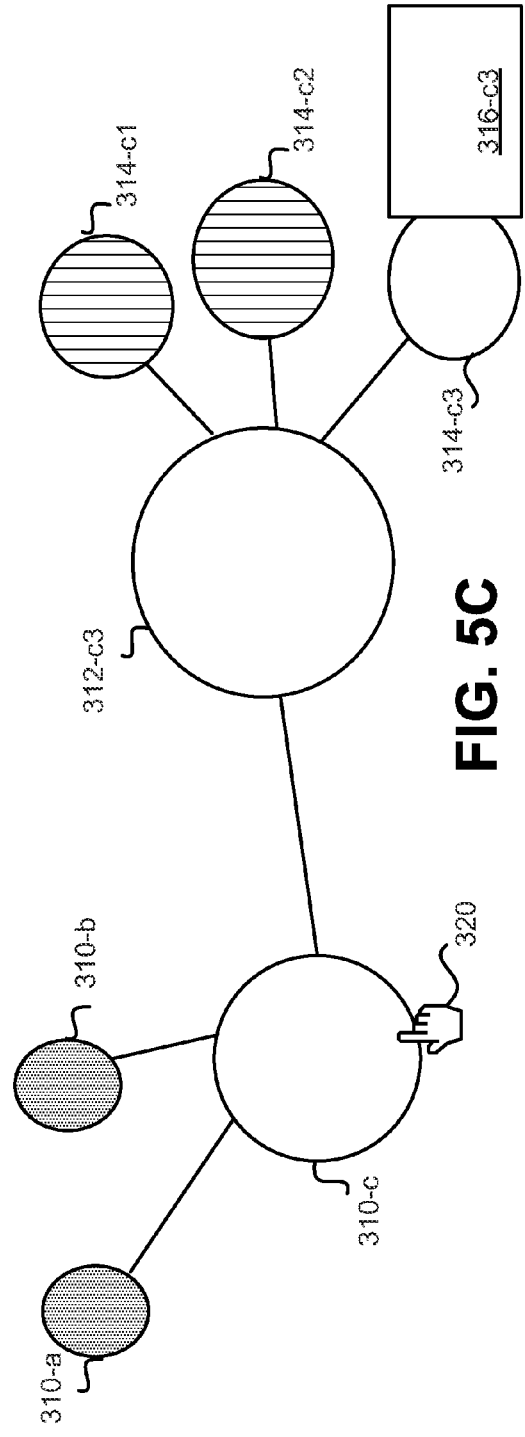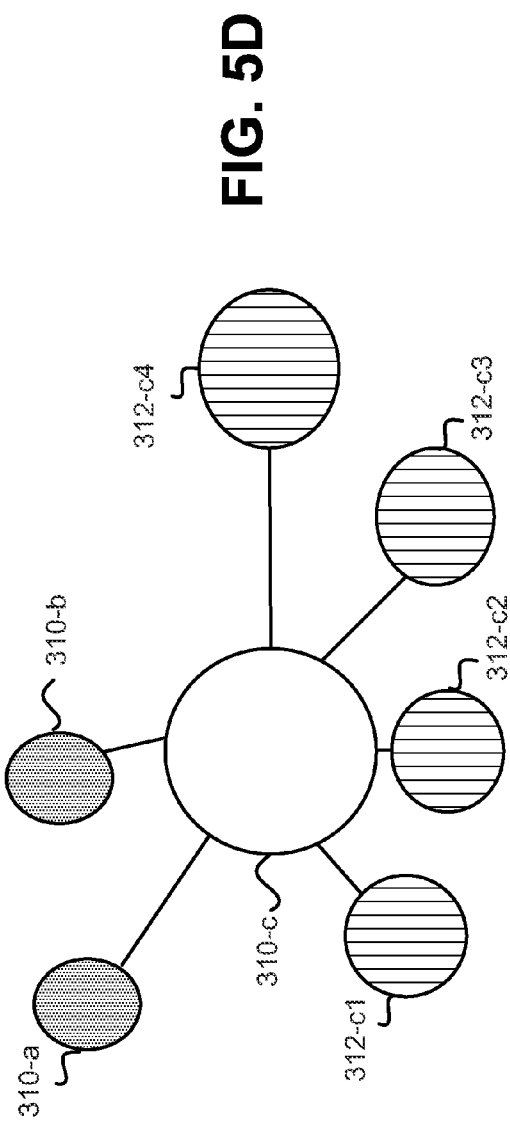

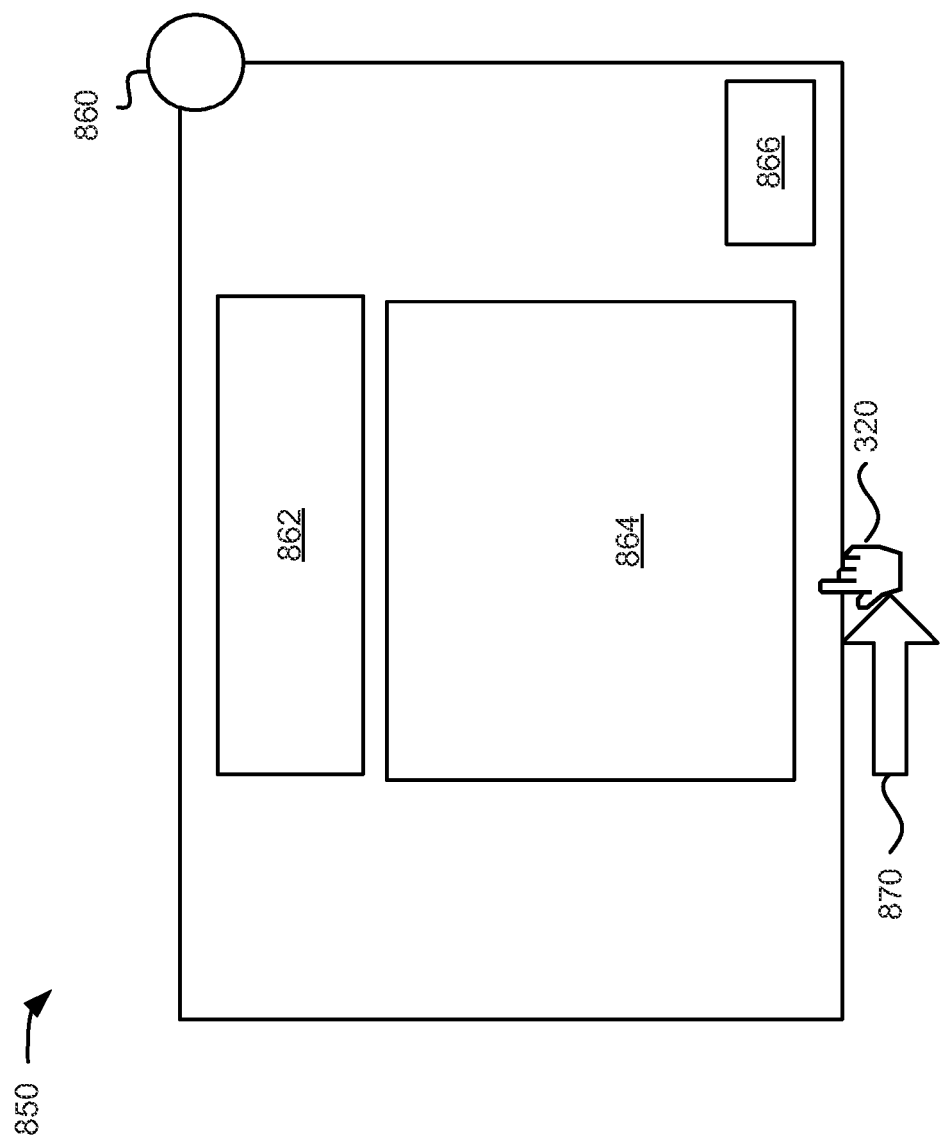

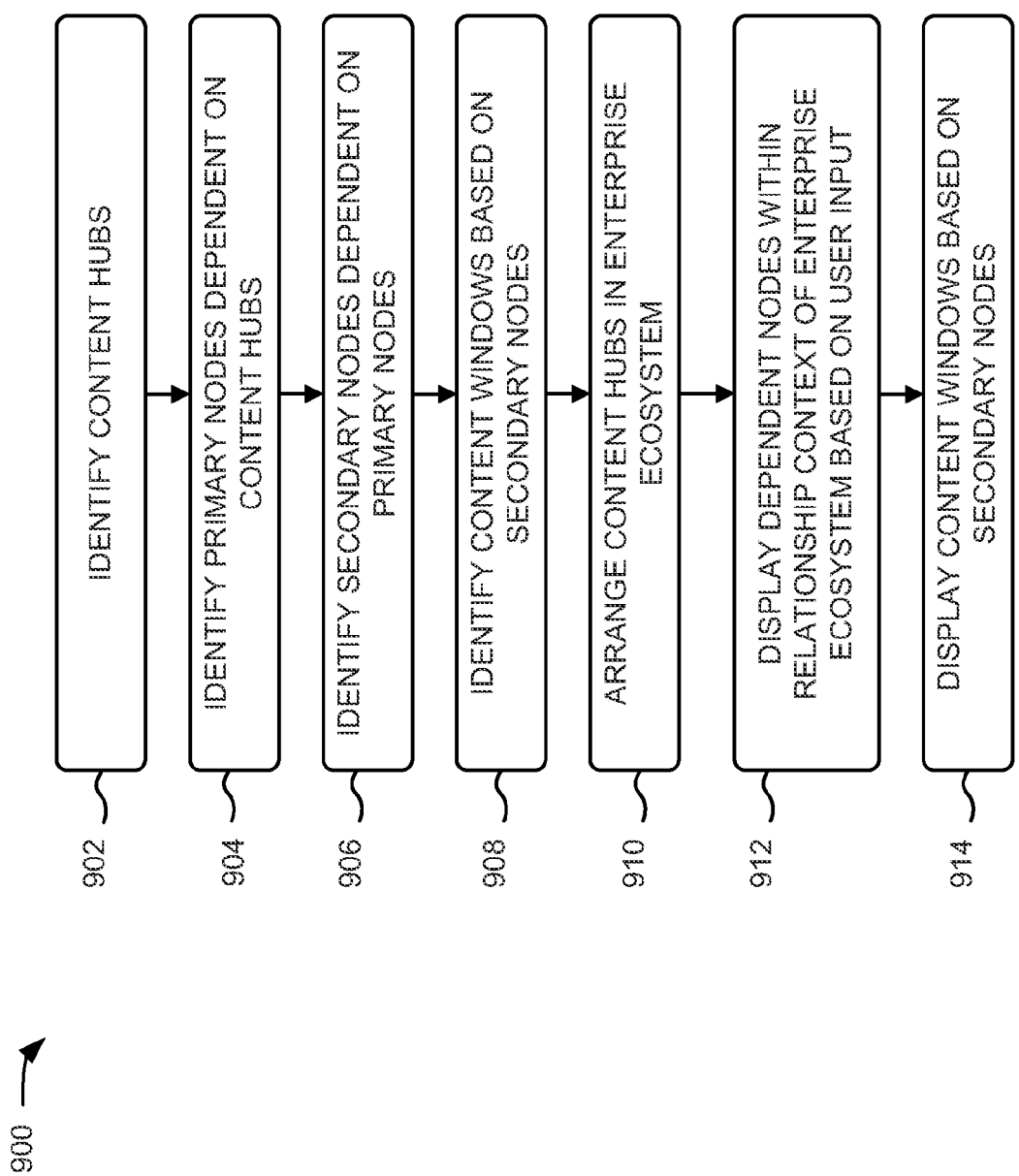

ENTERPRISE ECOSYSTEM

BACKGROUND

Information regarding an organization may be organized based on different categories relevant to the organization. Each category may have subcategories of information. The information may be visually represented using a tree structure. For example, information may be organized in a tree structure.

BRIEF DESCRIPTION OF THE DRAWINGS

FIG. 1 illustrates an exemplary user interface of a device including a representation of an enterprise ecosystem in which systems and methods described herein may be implemented;

FIG. 2 illustrates an exemplary configuration of one or more of the components of FIG. 1;

FIGS. 3A-3D are diagrams of exemplary navigation states of the enterprise ecosystem of FIG. 1;

FIGS. 4A-4D are diagrams illustrating selection of nodes from a content hub of the enterprise ecosystem of FIG. 1;

FIGS. 5A-5D are diagrams illustrate navigation between a content node and a content hub;

FIGS. 8A-8C are diagrams of content associated with nodes; and

FIG. 9 is a flowchart of an exemplary process for navigating an enterprise ecosystem.

DETAILED DESCRIPTION OF PREFERRED EMBODIMENTS

Figures 3C, 3D:
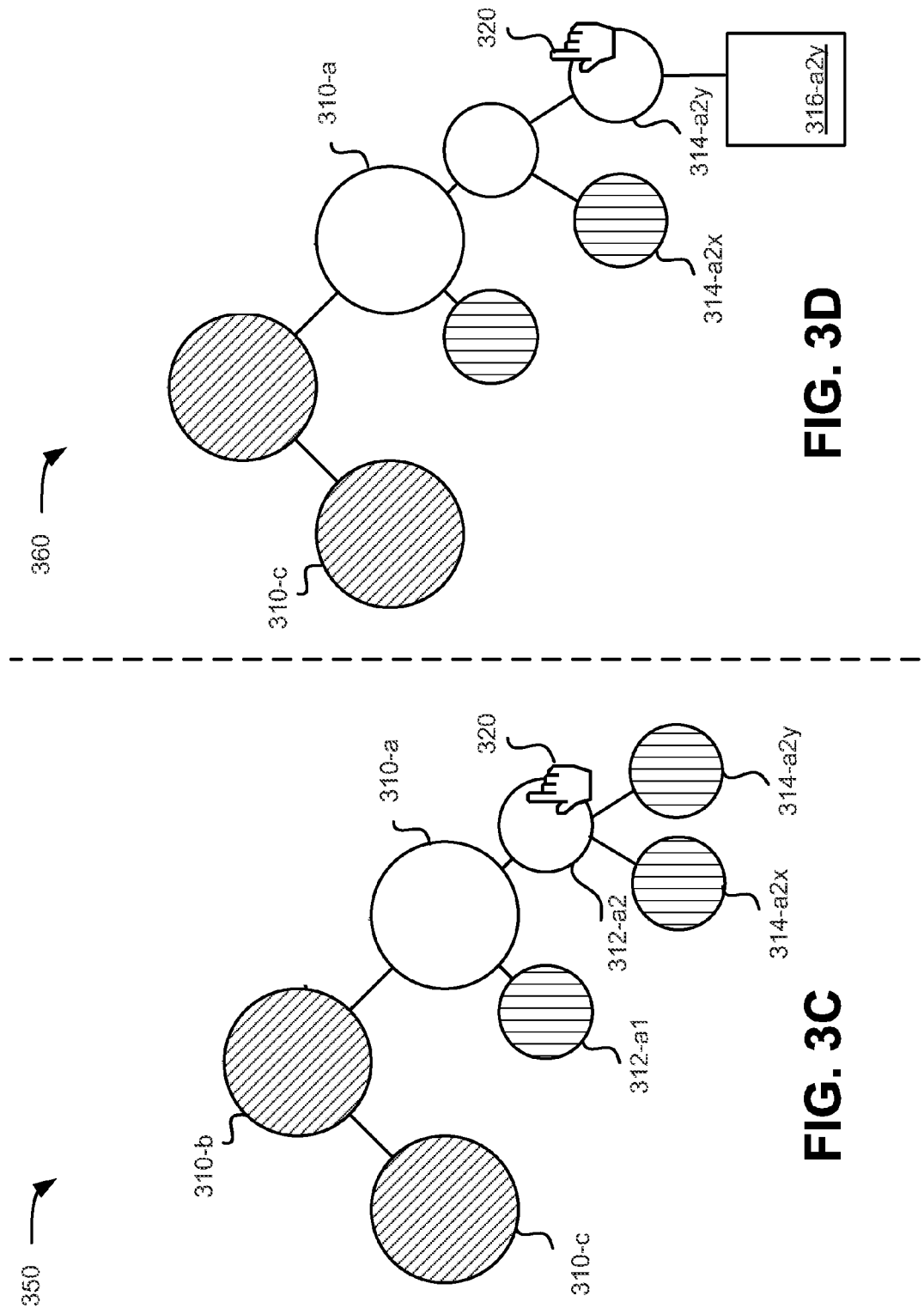

The following detailed description refers to the accompanying drawings. The same reference numbers in different drawings may identify the same or similar elements. Also, the following detailed description is exemplary and explanatory only and is not restrictive of the invention, as claimed.

Systems and/or methods described herein may provide a navigable representation of an enterprise ecosystem. The enterprise ecosystem may be represented as different divisions, the highest level divisions being content hubs. Each content hub represents a type of content (e.g., core aspect) of the enterprise ecosystem. For example, each content hub may represent a line of products or services provided by the enterprise. The content hubs may have dependent nodes. The nodes may represent subdivisions of the products or services represented by the content hubs. The nodes may include associated content cards that provide detailed information regarding the nodes. The enterprise ecosystem may be presented in a graphic user interface (GUI) as connected content hubs. The content hubs, nodes and content cards may receive input that allow the user to selectively display different divisions of the enterprise ecosystem while maintaining a context of the displayed information in the enterprise ecosystem.

As used herein, the terms "user," "consumer," "subscriber," and/or "customer" may be used interchangeably. Also, the terms "user," "consumer," "subscriber," and/or "customer" are intended to be broadly interpreted to include a device or a user of a device.

FIG. 1 is a diagram illustrating components of an exemplary display 104 of a device 100 in which systems and methods described herein may be implemented. Display 104 may include a touch enabled user interface. Device 100 may include a commercial display (e.g., a wall size display) associated with an enterprise or a consumer electronic device, such as a mobile telephone, a cellular phone, a personal communications system (PCS) terminal, an electronic notepad, a tablet computer, a laptop, and/or a personal computer, etc.

In this implementation, device 100 may take the form of an interactive wall display. As shown in FIG. 1, device 100 may include a touchscreen display 104, and a housing 110. Although user interface 100 is shown with particular components and a particular configuration, device 100 may include fewer, more or different components, such as additional sensors, input devices, and may include associated devices (e.g., a stylus) etc.

In implementations described herein, device 100 may include a program that includes instructions to display a navigable representation of an enterprise ecosystem 300. Enterprise ecosystem 300 may be represented as different divisions or levels of information, the highest level divisions being content hubs 310 (i.e., high level view). Each content hub 310 represents a type of content that may be associated with a core aspect of the enterprise ecosystem 300. For example, each content hub may represent a line of products or services provided by the enterprise, such as devices, applications, and networks for a telecommunications provider. Content hubs 310 may include a devices content hub, an applications content hub, a network content hub, a services content hub, a products content hub, and an organizational division content hub. Lower level divisions of content or other information may be displayed as nodes, which are dependent on each content hub. Lower level divisions may represent subdivisions of the core aspect represented by content hub 310.

As shown in FIG. 1, enterprise ecosystem 300 may be in an ambient state, in which a customer has not provided an input (or collapsed lower level divisions). Content hubs 310 may have predetermined motions, color and brightness in the ambient mode. As described herein below with respect to FIG. 3A through FIG. 9, enterprise ecosystem 300 may receive input that allow the user to selectively display dependent nodes of enterprise ecosystem 300 while maintaining a context of the displayed information.

Display 104 may provide visual information to the user, such as a navigable representation of an enterprise ecosystem 300. In addition, display 104 may include a touchscreen for providing interactive input to device 100, including selections of divisions of enterprise ecosystem 300 (e.g., content hubs 310) based on user motion. Display 104 may provide hardware/software to detect the coordinates of an area that is touched by a user. For example, display 104 may include a display panel, such as a liquid crystal display (LCD), organic light-emitting diode (OLED) display, and/or another type of display that is capable of providing images to a viewer. Display 104 may include a transparent panel/surface for locating the position of a finger or an object (e.g., stylus) when the finger/object is touching or is close to display 104. Display 104 may enable a user to manipulate objects displayed, for example, increase or decrease size.

In one implementation, device 100 may include a peripheral device, such as a mouse, keyboard, etc., which may allow device 100 to receive input from a user.

FIG. 2 is a block diagram of exemplary components of device 200. Device 200 may represent components implemented or included within device 100. As shown in FIG. 2, device 200 may include a bus 210, a processing unit 220, a memory 230, an input device 240, an output device 250, and a communication interface 260. In different implementations, device 200 may include additional, fewer, or different components than the ones illustrated in FIG. 2.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include a transceiver that enables device 200 to communicate with other devices and/or systems. For example, communication interface 260 may include mechanisms for communicating with other devices, such as other devices of environment 100.

As described herein, device 200 may perform certain operations in response to processing unit 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Alternatively, or additionally, one or more components of device 200 may perform one or more other tasks described as being performed by one or more other components of device 200.

FIGS. 3A-3D are diagrams of exemplary navigation states, 330, 340, 350, and 360, of enterprise ecosystem 300. Each of navigation states 330-360 may represent a state of content hubs 310 with respect to input from a user. As shown in FIGS. 3B-3D, enterprise ecosystem 300 may receive a selection input 320, for example when a user touches display 104 at coordinates corresponding to a selected division of enterprise ecosystem 300. Alternatively, the user may provide selection input 320 based on a cursor or keyboard input, etc.

FIG. 3A shows a non-selected navigation state 330 in which no content hubs 310 are selected. All content hubs 310 are shown in a default state. For example, enterprise ecosystem 300 may be in an ambient state, such as a screen saving mode. In non-selected navigation state 330, content hubs 310 may rotate (e.g., around a central axis with respect to each other) or otherwise move across display 104 in the ambient state.

FIG. 3B shows a selected hub navigation state 340 in which content hub 310-*a* is selected. For example, a user may provide selection input 320 by touching display 104. Content hub 310-*a* may be highlighted and all child nodes (nodes 312-*a*1 and 312-*a*2) of the selected parent hub (content hub 310-*a*) are displayed. Nodes 312 represent lower level subdivisions of information represented by content hubs 310. For example, if content hub 310-*a* represents devices provided by an enterprise, nodes 312-*a* may represent different types of devices provided by the enterprise, such as healthcare devices, gaming devices, retail devices, healthcare devices, consumer devices, etc.

Parent content hubs 310 is highlighted (indicated by un-shaded or white circles in the figures) based on user selection 320. In a GUI of display 104, the highlighted components may be indicated by an increase in brightness, a change in color, etc. For example, content hub 310-*a* may change a brightness and/or color. When the user or customer provides selection input 320, motion of content hubs 320 may stop (if content hubs 320 are in motion).

FIG. 3C shows a selected node navigation state 350 in which a node 312-*a*2 of content hub 310-*a* is selected. In this instance, the selected node 312-*a*2 is a primary node and the dependent node 314-*a*2*x* and 314-*a*2*y* (from the primary node) are secondary nodes (or grandchild nodes 312-*a*2 with respect to content hub 310-*a*). For example, if primary node 312-*a*2 represents healthcare devices, secondary node 312-*a*2*y* may represent a particular model of healthcare device. The selected child (i.e., dependent) node 312-*a*2 and parent content hub 310-*a* from which node 312-*a*2 arises are highlighted (indicated by un-shaded or white circles) based on user selection 320. A path between highlighted components (e.g., from a content hub 310-*a* to selected node 312-*a*2) may be indicated by visual effects, such as color changes, streamers, and other moving effects. The path may be used to visually identify a relationship between the child nodes 312*a*2 and the parent content hub 310-*a*.

FIG. 3D shows a node content navigation mode 360 in which a secondary node 314-*a*2*y* is selected. For example, the user may apply a touch input (320) to secondary node 314-*a*2*y* in display 104. In this instance, all child nodes of the content hub 310-*a* may be displayed. The parent content hub 310-*a*, primary node 312-*a*2 and selected secondary node 314-*a*2*y* may be highlighted. The selected (secondary) node 314-*a*2*y* in this instance is a content node. A content node provides specific information about particular products or services, etc., provided by the enterprise. A content window 316 (in this instance content window 316-*a*2*y*) may be displayed in a GUI, such as display 104. Content window 316 may include information such as described below with respect to FIG. 9.

Figure 4A:
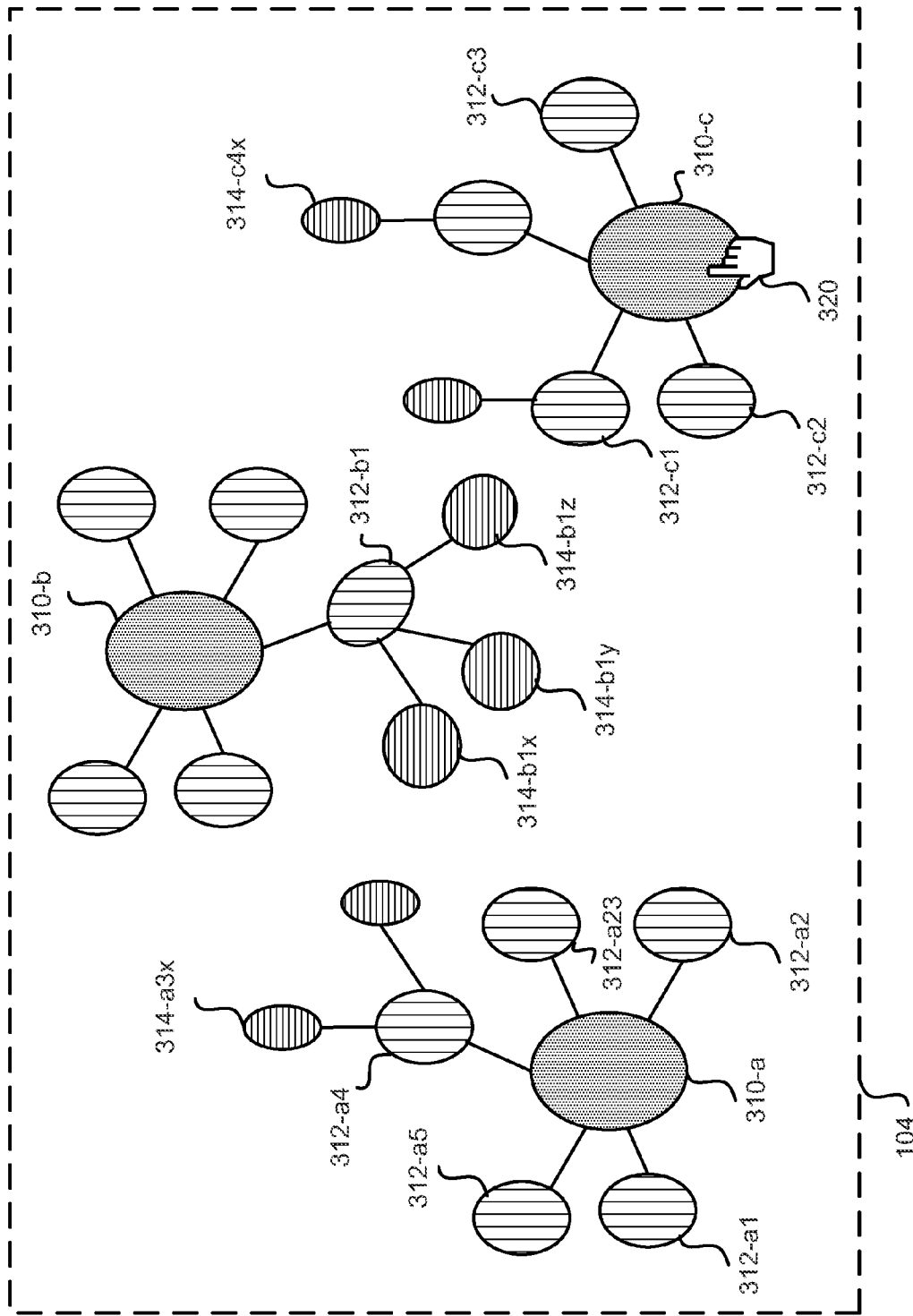
Figure 4B:
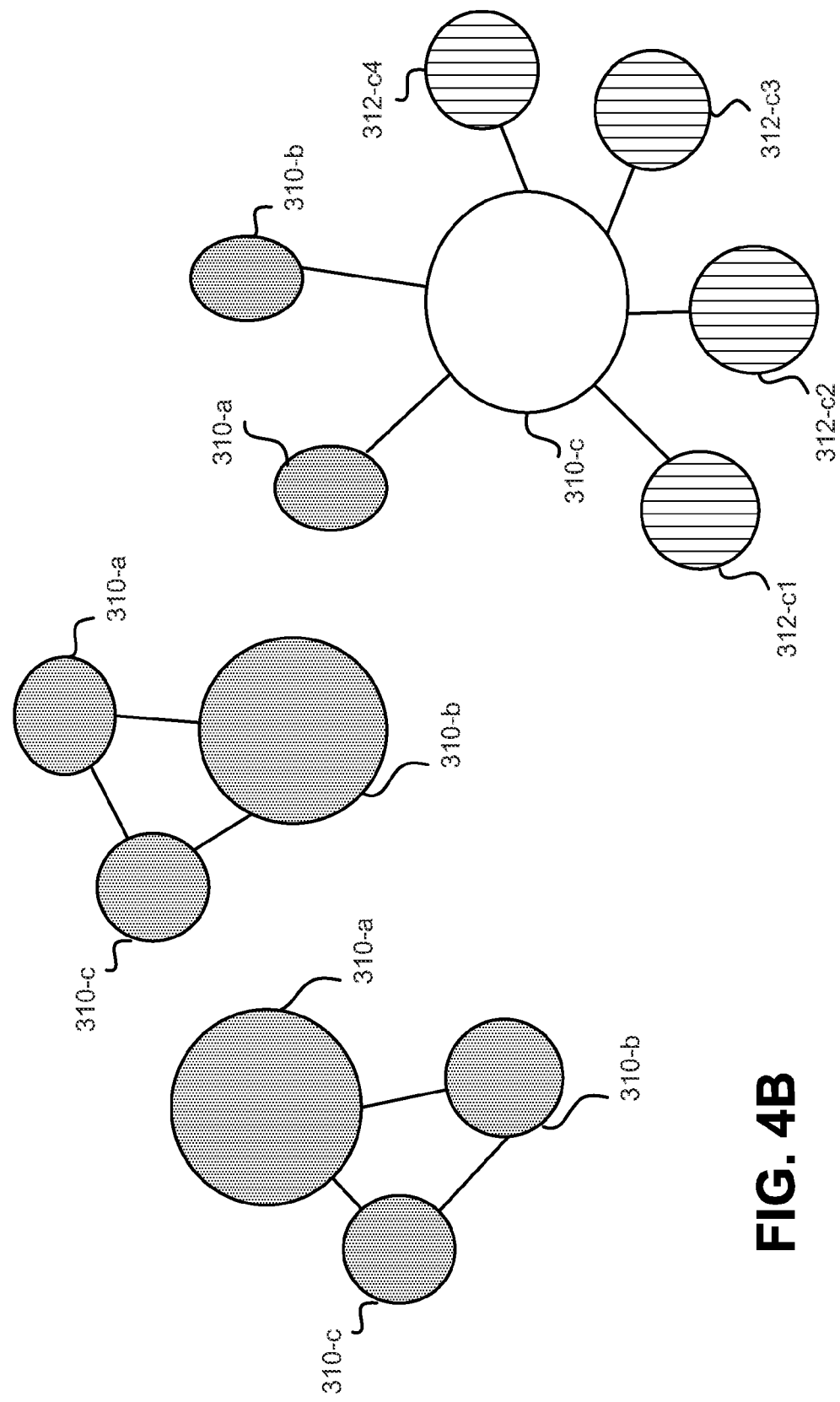

FIGS. 4A-4B are diagrams illustrating selection of content hubs 310. As shown in FIGS. 4A and 4B, content hubs 310-*a*, 310-*b*, and 310-*c* may each occupy a section of display 104.

As shown in FIG. 4A, each of content hubs 310-*a*, 310-*b*, and 310-*c* may initially include displayed primary nodes 312 and secondary nodes 314. The displayed primary nodes 312 and secondary nodes 314 may automatically rotate (e.g., around their corresponding content hubs 310). The displayed primary nodes 312 and secondary nodes 314 may be included in an alternate ambient mode that allows a user to make identify particular primary nodes 312 or secondary nodes 314 of interest to the user.

FIG. 4A also shows selecting (e.g., by tapping) a content hub 310. Tapping content hub 310-*c* may end automatic rotation of child nodes 312 and grandchild nodes 314. FIG. 4B shows that the selected content hub 310-*c* may be highlighted and increased in size (after tapping content hub 310-*c* in FIG. 4A). All child nodes 312-*c* (nodes 312-*c*1 and node 312-*c*2) for the selected content hub 310-*c* may be displayed. The child nodes 312 for the non-selected content hubs 310 may be concealed while the non-selected content hubs (310-*a* and 310-*b*) are displayed in context in enterprise ecosystem 300 with the other content hubs 310 (which may be relatively reduced in size) in particular sections of display 104 (e.g., each of the three content hubs 310 may be located in a separate third of display 104).

FIG. 4C shows tapping a child node 312-*c* to highlight the selection. FIG. 4D shows that the selected node's children may be displayed. Tapping child node 312-*c*4 may also collapse the sibling nodes (nodes 312-*c*1, 312-*c*2, and 312-*c*3). Primary node 312-*c*4 and content hub 310-*c* may be highlighted to show the path to the selected content.

FIGS. 5A-5D are diagrams illustrating navigation between a (secondary) content node 314 and a content hub 310.

FIG. 5A shows selecting a (secondary) content node 314 (node 314-*c*3 in this instance). Tapping content node 314-*c*3 may highlight the selected node 314-*c*3. As shown in FIG. 5B, sibling nodes 314 (nodes 314-*c*1 and 314-*c*2) may remain visible. The content node's 314 details may be opened in a breakout window 316-*c*3 (as shown with respect to FIG. 7C herein below).

All content hubs 310 and parent nodes 312 may remain visible as the user navigates down through the content hierarchy (e.g., from content hub 310 through primary node 312 to secondary node 314) (FIG. 5C). The user may collapse the secondary nodes 314 by selecting a content hub 310-*c*, as shown in FIG. 5. Tapping a content hub 310 collapses all the child nodes (primary nodes 312 and secondary nodes 314) back to the selected parent content hub 310-*c*.

The primary child nodes 312 of content hub 310 are displayed after user input 320 is received, as shown in FIG. 5D.

Figure 6:
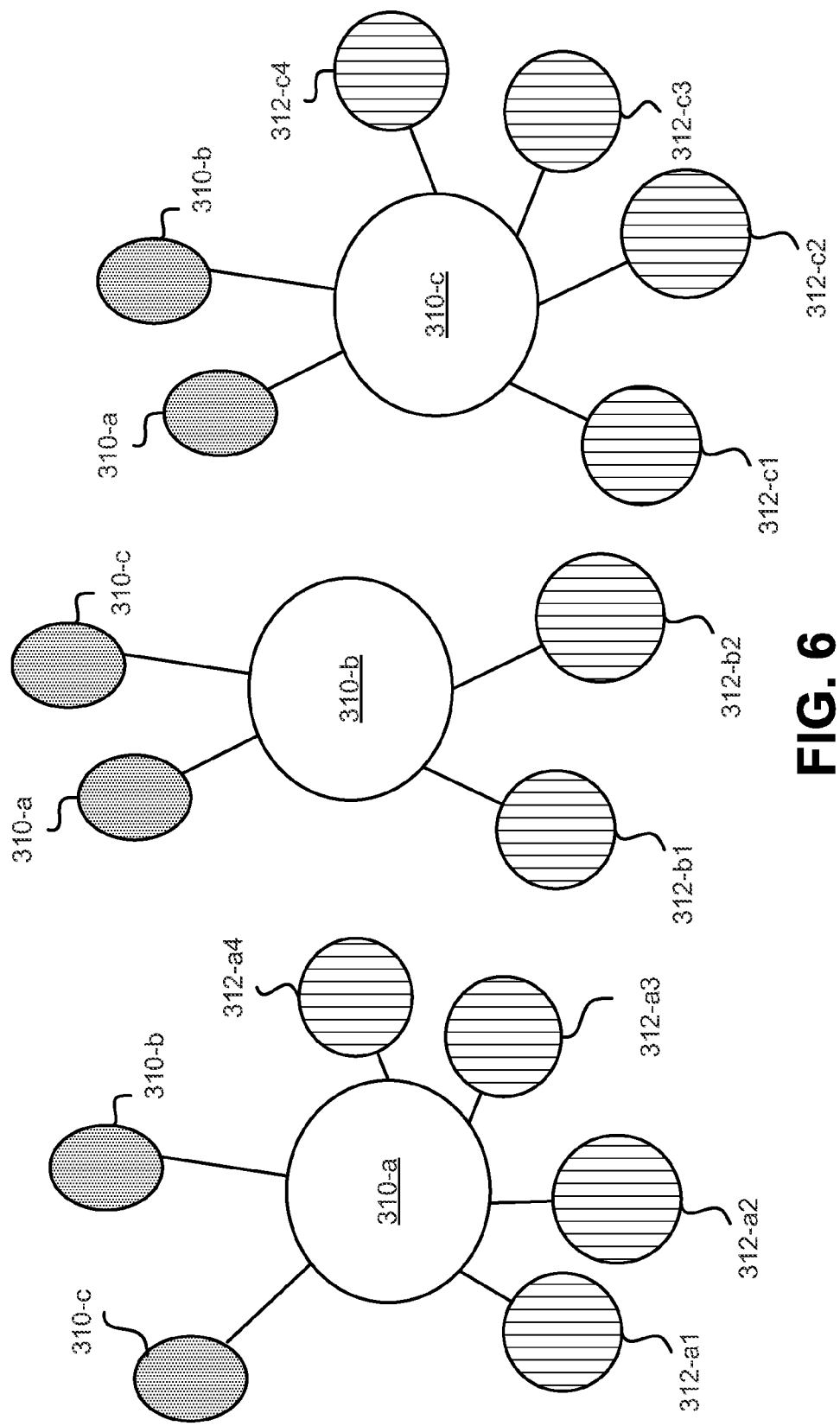
FIG. 6 is a diagram of multiple selected content hubs.

FIG. 6 is a diagram of an implementation in which multiple content hubs 310 (hubs 310-*a*, 310-*b*, and 310-*c*) are selected.

Each content hub 310 may be selected and expanded independently, without impacting the other opened content hubs 310. Each content hub 310 may navigate independently. In one implementation (not shown), a same content hub 310 may be expanded independently in each screen area (e.g., the user may expand primary nodes 312*a* or secondary nodes 314*a* of content hub 310 in different screen areas). This may allow a user to navigate to different secondary nodes 314 in different sections of display 104 at a same time.

When a new content hub 310 is opened and navigated the position and scale of the new selection (i.e., content hub 310 and dependent nodes (primary nodes and, in instances in which they are displayed, secondary nodes 314) may be adjusted to fit the screen without disturbing the position of the other content hubs 310 previously displayed on the screen.

Figure 7C:
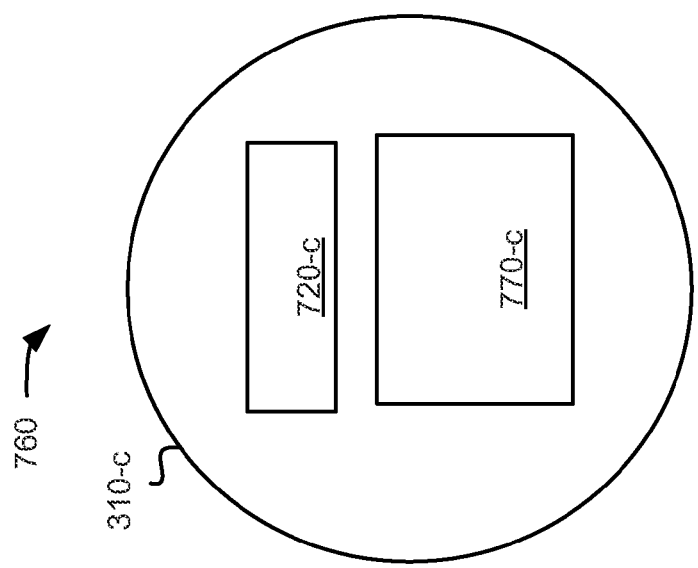
FIGS. 7A-7C are diagrams of content associated with content hubs.
Figure 7B:
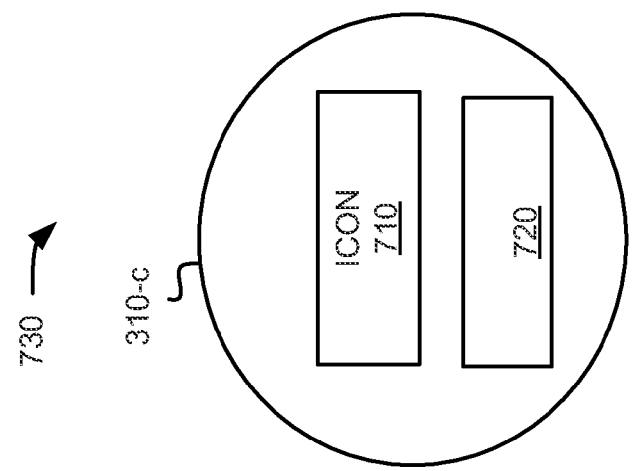
Figure 7A:
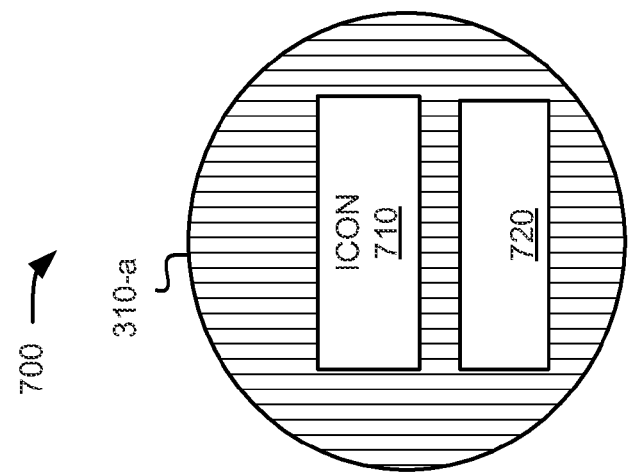

FIG. 7A-7C are diagrams 700, 730 and 760 of content associated with content hubs 310. As shown in FIG. 7A-7C, content may be displayed with respect to a non-selected content hub 310 (diagram 700, FIG. 7A), a selected content hub 310 (diagram 730, FIG. 7B), and a selected content hub 310 (diagram 760, FIG. 7C) that includes image content.

FIG. 7A shows a non-selected content hub 310 (e.g., content hub 710-*a* from FIG. 5C). Non-selected content hub 310-*a* may include a configurable icon 710 (e.g., Icon 710-*a*). Icon 710-*a* may correspond to a particular service or product associated with content hub 710-*a* (e.g., a picture of a device for a content hub 710 associated with devices). Non-selected content hub 310-*a* may include a title 720 (e.g., title 710-*a*). Device 100 may receive configurable icon 710-*a* and title 720-*a* from an associated data source.

FIG. 7B shows a selected content hub 310 (e.g., content hub 710-*c* from FIG. 5C). Selected content hub 310-*c* may include a configurable icon 710 (e.g., Icon 710-*c*). Icon 710-*c* may correspond to a particular service or product associated with content hub 710-*c* (e.g., a picture of a network for a content hub 710-*c* associated with networks). Selected content hub 310-*c* may include a title 720-*c*. Device 100 may receive configurable icon 710-*c* and title 720-*c* from an associated data source.

FIG. 7C shows a selected content hub 310 with image content. Selected content hub 310-*c* may include a title 720 and may be configured to contain an image 770 when selected. Image 770 may include additional detail regarding the content associated with content node 312, such as an additionally detailed image (when compared to icon 710) or summary text (e.g., "these are the devices offered by service provider" or "click here for additional information on devices", etc.). Device 100 may configure a maximum size for image 770. Device 100 may receive configurable image 770 and title 720-*c* from an associated data source.

Figure 8B:
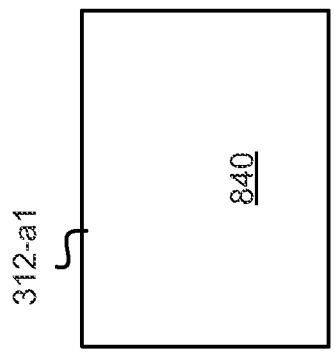
Figure 8A:
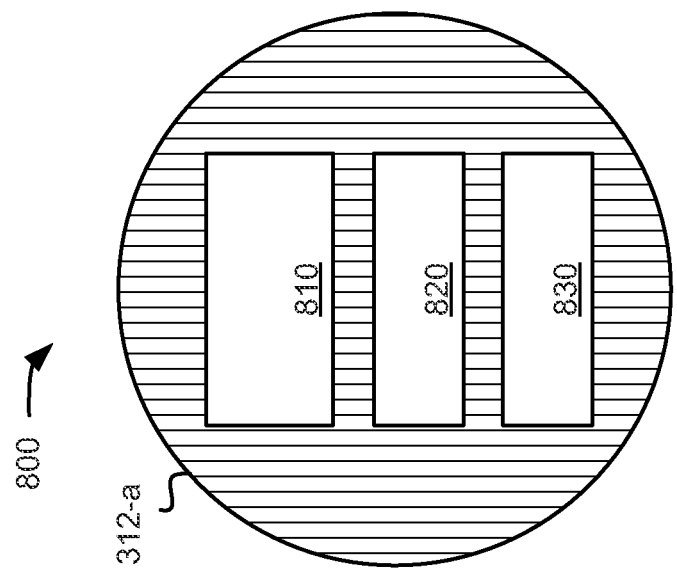

FIGS. 8A-8C are diagrams of content associated with nodes (e.g., primary nodes 312 or secondary nodes 314).

FIG. 8A shows a non-selected node 312 with text (e.g., node 312-*a*1 from FIG. 4A). Non-selected node 312 may include a configurable icon 810 and a title 820. Additionally, non-selected node 312 may display a node count indicator 830 that provides a count of child nodes associated with non-selected node 312. Device 100 may receive configurable icon 810, a title 820, and node count indicator 830 from a data source based on a relationship in which parent node identifier (ID) is of the non-selected node 312 (i.e., a count of secondary nodes 314 associated with non-selected node 312).

FIG. 8B shows non-selected node 312 with a background image 840. Device 100 may configure non-selected node 312 to display a background image 840. Non-selected node 312 may take a shape of the image supplied (i.e., the shape of background image 840). Device 100 may receive background image 840 from a data source that includes a node background image ID associated with background image 840.

FIG. 8C shows a content window 850. Content window 850 (i.e., a "breakout window") may open when a visitor taps (320) a content node (e.g., secondary node 314-*c*3 from FIGS. 5A to 5D). Content window 850 may be manually closed by tapping on close button 860. Nodes (312 or 314) may close automatically when another node is selected within a hierarchy of a same content hub 310. Device 100 may optionally configure a title 862 for content window 850. Any of the associated content types 864 may be displayed in the content stage. For example, video, pictures, etc., that describes available products or services may be included in content window 850. A quick response (QR) code 866 may be optionally included in content window 850.

According to one implementation, content window 850 may provide a takeaway experience. For example, content window 850 may provide a QR code 866 that provides access to a website associated with applications referenced/included in enterprise ecosystem 300. Content window 850 may be dragged (870) to another location in display 104. Content window 850 may also be expanded, contracted and otherwise manipulated based on user input.

FIG. 9 is a flowchart of an exemplary process 900 for providing an integrated video guide. Process 900 may execute in device 100. It should be apparent that the process discussed below with respect to FIG. 9 represents a generalized illustration and that blocks/steps may be added or existing blocks/steps may be removed, modified or rearranged without departing from the scope of process 900.

At block 902, device 100 may identify a plurality of content hubs 310 associated with an enterprise. For example, device 100 may access a database that includes content hubs 310 associated with a telecommunications provider. The content hubs 310 may each include content associated with the enterprise, such as devices, networks, and applications for the telecommunications provider. In other implementations the content hubs 310 may include products, services, organizational divisions, etc., associated with a particular enterprise.

At block 904, device 100 may identify primary nodes 312 dependent on each content hub 310. Device 100 may identify, for each content hub 310, primary nodes 312 that include subgroups of content represented by content hub 310. For example, if content hub 310 represents devices provided by a telecommunications provider, each primary node 312 may represent a group of devices, such as retail devices, healthcare devices, industrial utility devices, public safety devices, enterprise devices, consumer devices, gaming devices, telematics devices, etc. If content hub 310 represents applications, primary nodes 312 may represent business applications, games applications, news applications, utility applications, entertainment applications, social networking applications, productivity tool applications, reading applications, etc.

Device 100 may identify secondary nodes 314 that are dependent on each primary node 312 (block 906). Device 100 may identify, for each primary node 312, secondary nodes 314 that include items of content from the groups represented by the parent primary node 312. For example, if the primary node 312 represents gaming devices, secondary nodes 314 may each represent a single gaming device.

At block 908, device 100 may identify content windows 850 based on secondary nodes 314. Content windows 850 may provide additional detail regarding items represented by secondary nodes 314. Content windows 850 may also provide links to access additional information.

Device 100 may arrange content hubs 310 in a visual representation of an enterprise ecosystem 300 (block 910). For example, device 100 may arrange the content hubs 310 linked to each other, such as shown in FIG. 1.

At block 912, device 100 may display dependent nodes within a relationship context of the visual representation of enterprise ecosystem 300 based on user input. In other words, device 100 may display a relationship between content hubs in enterprise ecosystem 300 concurrently with a display of a relationship between dependent nodes and the content hubs 310. Device 100 may present enterprise ecosystem 300 as an interactive interface. Device 100 may present primary nodes 312 that are dependent on content hubs 310 and secondary nodes that are dependent on primary nodes based on user selection. The user may cause dependent nodes to be displayed by touching the node 312 or content hub 310 on which the node is dependent. The links between dependent nodes and associated content hubs 310 may be displayed in a manner that highlights and otherwise emphasizes the connection between the dependent node and parent node or content hub 310. The nodes may be collapsed to the content hub 310 based on user input (320) provided to a content hub 310 in the nodes' hierarchy.

At block 914, device 100 may display content windows 850 based on a secondary node 314. For example, if secondary node 314 represents a particular device, content window 850 may include specifications of the device, video that demonstrates usage of the device, links to additional information regarding the device, etc. Content window 850 may be closed by tapping on a close button 866.

Systems and/or methods described herein may visually communicate an enterprise ecosystem. The messaging and visualization may be configured to entice prospective users/customers to touch the screen. For example, content hubs in enterprise ecosystem may simulate motion and variation of color and/or brightness within a confined area of the display screen. The enterprise ecosystem may provide breadth of information (i.e., an overview of the entire ecosystem) with depth (i.e., a detailed view of particular subgroups, content items, or detailed information based on content items) in the same view.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIG. 9, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions of the invention may be implemented as a "component" or "system" that performs one or more functions. These components/systems may include hardware, such as a processor, an ASIC, or a FPGA, or a combination of hardware and software.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A computer-implemented method comprising: identifying a plurality of content hub icons associated with an enterprise, wherein each content hub icon represents a type of information and content corresponding to a core aspect of the enterprise;
   identifying primary nodes dependent on each content hub icon, wherein the primary nodes represent subgroups of the content the content hub icon;
   identifying secondary nodes associated with each primary node, wherein the secondary nodes represent content items from the subgroups of content associated with the primary nodes;
   arranging the content hub icons in a visual representation of an enterprise ecosystem, wherein the enterprise ecosystem represents an ecosystem of an enterprise and displays a relationship between the content hub icons, and wherein the content hub icons are to be represented in predetermined motion with respect to each other;

presenting the enterprise ecosystem in a touch enabled user interface; receiving at least one user selection corresponding to at least one of the content hub icons, the primary nodes or the secondary nodes;

changing a size of the selected at least one of the content hub icons, the primary nodes or the secondary nodes based on the at least one user selection;

rearranging a display of displaying dependent nodes within a relationship context of the enterprise ecosystem based on the at least one user selection, wherein the relationship context defines a visual representation of a relationship between at least one of the primary nodes or the secondary nodes and at least one of the plurality of content hub icons;

receiving a user selection of a particular secondary node;

displaying a content window associated with the particular secondary node, wherein the content window displays at least one of video or pictures that correspond to a particular content item and includes a quick response code to access a website associated with the particular content item; and expanding the content window based on additional user input.

2. The computer-implemented method of claim 1, wherein the plurality of content hub icons associated with the enterprise include one or more of a devices content hub icon that represents devices associated with the enterprise, an applications content hub icon that represents applications associated with the enterprise, a network content hub icon that represents networks associated with the enterprise, a services content hub icon that represents services associated with the enterprise, a products content hub icon that represents products associated with the enterprise, and an organizational division content hub icon that represents organizational divisions associated with the enterprise.

3. The computer-implemented method of claim 1, further comprising:

displaying the enterprise ecosystem in an ambient state, wherein the content hub icons automatically rotate in the ambient state.

4. The computer-implemented method of claim 1, wherein displaying the dependent nodes further comprises:

displaying all primary nodes associated with a particular content hub icon based on the at least one user selection provided to the particular content hub icon.

5. The computer-implemented method of claim 4, further comprising:

receiving a user selection of a particular primary node from the primary nodes associated with the particular content hub icon;

displaying all secondary nodes associated with the particular primary node based on the user selection; and highlighting the particular primary node.

6. The computer-implemented method of claim 5, further comprising:

receiving a further user selection of the particular content hub icon; and collapsing all of the dependent nodes to the particular content hub icon based on the further user selection of the particular content hub icon.

7. The computer-implemented method of claim 1, further comprising:

identifying a relationship between each node in a hierarchy of a content hub icon based on a connector between the node and corresponding content hub icon.

8. The computer-implemented method of claim 1, further comprising:

highlighting a selected node.

9. The computer-implemented method of claim 1, wherein dependent nodes automatically rotate around each of the plurality of content hub icons, further comprising:

receiving at least one tap at a particular one of the plurality of content hub icons to end automatic rotation of the dependent nodes;

selecting the particular one of the plurality of content hub icons based on the at least one tap;

increasing a relative size of the particular one of the plurality of content hub icons; and concealing all dependent nodes for each non-selected content hub icon.

10. The computer-implemented method of claim 1, wherein each content hub icon is independently selectable and expandable within a context of the enterprise ecosystem.

11. The computer-implemented method of claim 1, further comprising:

highlighting a selected secondary node based on an additional user selection; and highlighting a path between the selected secondary node and a parent content hub icon, wherein highlighting the path visually identifies a relationship between the selected secondary node and the parent content hub icon.

12. A device, comprising: a memory to store a plurality of instructions; a touch enabled user interface; and a processor configured to execute the instructions in the memory to:

identify a plurality of content hub icons associated with an enterprise, wherein each content hub icon represents a type of information and content corresponding to a core aspect of the enterprise;

identify primary nodes dependent on each content hub icon, wherein the primary nodes represent subgroups of the content associated with the content hub icon;

identify secondary nodes associated with each primary node, wherein the secondary nodes represent content items of the subgroups of content associated with the primary nodes;

arrange the content hub icons in a visual representation of an enterprise ecosystem, wherein the enterprise ecosystem represents an ecosystem of an enterprise and displays a relationship between the content hub icons, and wherein the content hub icons are to be represented in predetermined motion with respect to each other;

present the enterprise ecosystem in the touch enabled user interface; receive at least one user input corresponding to at least one of the content hub icons, the primary nodes or the secondary nodes;

change a size of the selected at least one of the content hub icons, the primary nodes or the secondary nodes based on the at least one user input;

rearrange a display of dependent nodes within a relationship context of the enterprise ecosystem based on the at least one user input, wherein the relationship context defines a visual representation of a relationship between at least one of the primary nodes or the secondary nodes and at least one of the plurality of content hub icons;

receive a user selection of a particular secondary node;

display a content window associated with the particular secondary node, wherein the content window displays at least one of video or pictures that correspond to a particular content item and includes a quick response code to access a website associated with the particular content item; and expand the content window based on additional user input.

13. The device of claim 12, where the device includes at least one of an interactive wall display or a tablet device.

14. The device of claim 12, wherein the dependent nodes include configurable icons based on content associated with the dependent nodes.

15. The device of claim 12, where, when displaying the dependent nodes, the processor is further to:
displaying all primary nodes associated with a particular content hub icon based on the at least one user input provided to the particular content hub icon.

16. A non-transitory computer-readable medium including instructions to be executed by a processor, the instructions including one or more instructions, when executed by the processor, for causing the processor to:
identify a plurality of content hub icons associated with an enterprise, wherein each content hub icon represents a type of information and content associated with corresponding to a core aspect of the enterprise;
identify primary nodes dependent on each content hub icon, wherein the primary nodes represent subgroups of the content associated with the content hub icon;
identify secondary nodes associated with each primary node, wherein the secondary nodes represent content items from the subgroups of content associated with the primary nodes;
arrange the content hub icons in a visual representation of an enterprise ecosystem, wherein the enterprise ecosystem represents an ecosystem of an enterprise and displays a relationship between the content hub icons, and wherein the content hub icons are to be represented in predetermined motion with respect to each other;
present the enterprise ecosystem in the touch enabled user interface; receive at least one user selection corresponding to at least one of the content hub icons, the primary nodes or the secondary nodes;
change a size of the selected at least one of the content hub icons, the primary nodes or the secondary nodes based on the at least one user selection;
rearrange a display of dependent nodes within a relationship context of the enterprise ecosystem based on the at least one user selection, wherein the relationship context defines a visual representation of a relationship between at least one of the primary nodes or the secondary nodes and at least one of the plurality of content hub icons;
receive a user selection of a particular secondary node;
display a content window associated with the particular secondary node, wherein the content window displays at least one of video or pictures that correspond to a particular content item and includes a quick response code to access a website associated with the particular content item; and expand the content window based on additional user input.

17. The non-transitory computer-readable medium of claim 16, wherein the one or more instructions further include instructions for causing the processor to:
receive a user selection based on a content node icon; and
provide a content window based on the content node icon.

18. The non-transitory computer-readable medium of claim 16, wherein the one or more instructions further include instructions for causing the processor to:
display the enterprise ecosystem in an ambient state, wherein the content hub icons automatically rotate in the ambient state.

19. The non-transitory computer-readable medium of claim 16, wherein, when displaying the dependent nodes, the one or more instructions further include instructions for causing the processor to:
display all primary nodes associated with a particular content hub icon based on the user selection provided to the particular content hub icon.

20. The non-transitory computer-readable medium of claim 16, wherein, when displaying the dependent nodes, the one or more instructions further include instructions for causing the processor to:
independently receive a selection and expand each content hub within a context of the enterprise ecosystem.

* * * * *